No. 775,891. PATENTED NOV. 22, 1904.
C. S. BRADLEY.
APPARATUS FOR GENERATING ELECTRIC CURRENTS.
APPLICATION FILED SEPT. 11, 1897.
NO MODEL.
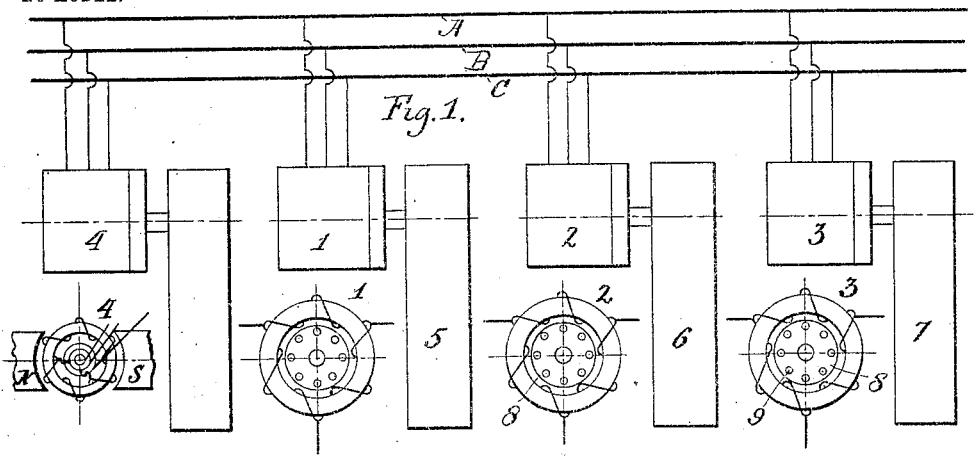
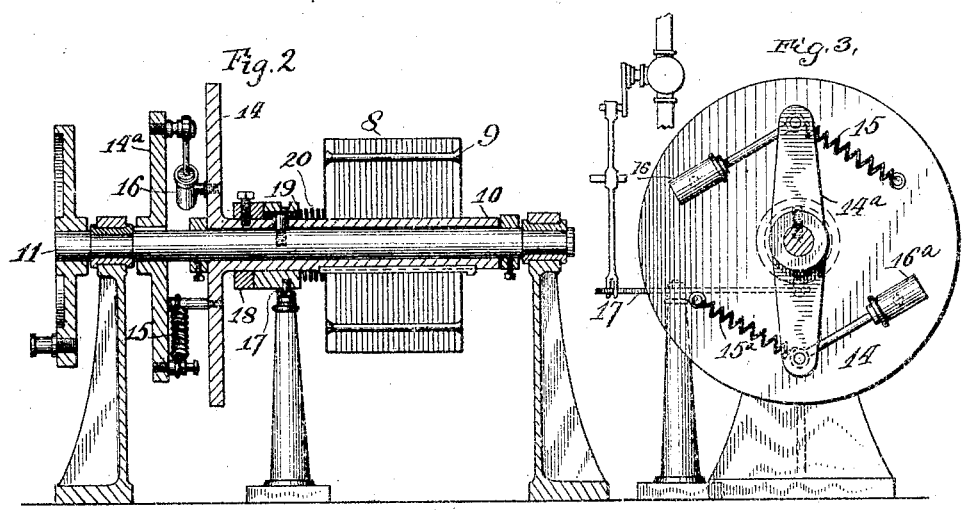
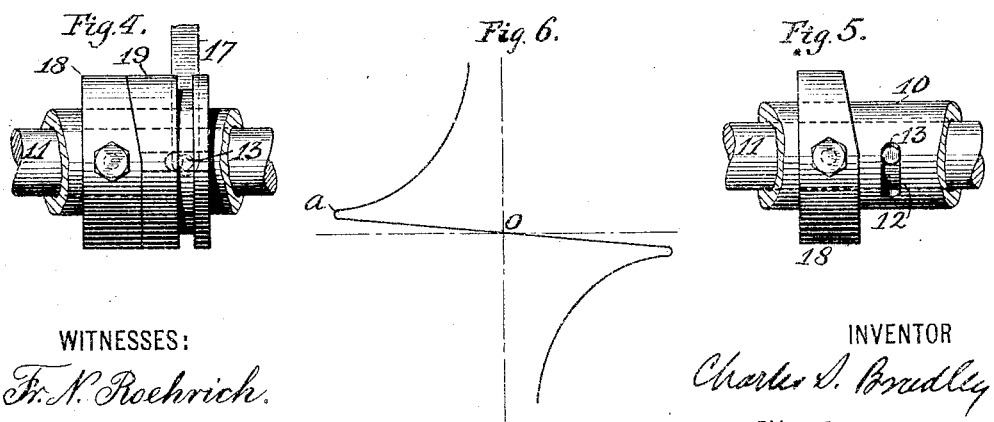
WITNESSES:
Fr. N. Roehrich.
C. L. Belcher.
INVENTOR
Charles S. Bradley
BY Ross H. Read
ATTORNEY No. 775,891. Patented November 22, 1904.

UNITED STATES PATENT OFFICE.

CHARLES S. BRADLEY, OF AVON, NEW YORK.

APPARATUS FOR GENERATING ELECTRIC CURRENTS.

SPECIFICATION forming part of Letters Patent No. 775,891, dated November 22, 1904.

Application filed September 11, 1897. Serial No. 651,311. (No model.)

*To all whom it may concern:*

Be it known that I, CHARLES S. BRADLEY, a citizen of the United States, and a resident of Avon, in the county of Livingston, in the State of New York, have invented certain new and useful Improvements in Apparatus for Generating Electric Currents, of which the following is a specification.

This invention relates to alternating-current generators. The object of the invention is to provide a generator of the induction type in which current is generated by the rotation of a secondary element above synchronism in a rotary magnetic field, the object being to combine such a machine with a prime mover, so that a uniform period of generated current will be maintained irrespective of change of load of the machine. Inasmuch as current in machines of this type is generated by the "slip" or difference in speed of the driven member over and above the speed of the rotary magnetic field and as this slip should vary with change of load, the prime mover must be so controlled that with increase of load of the generator-circuits said prime mover will increase in speed, a condition which is diametrically the opposite to what maintains with ordinary engines or prime movers which tend to slow down under increase of load. I accomplish this result by making an elastic connection between the driven member of the induction-generator and the prime mover which constitutes, in effect, a dynamometer-governor, the movements of which are used to increase or decrease the steam or other source of power used in the prime mover, for example, by acting upon a valve or throttle in the supply-pipe of the engine. Thus when the load of the generator increases the dynamometer device is distended by the greater torque of the generator and opens the throttle to increase the supply of steam, thereby increasing the slip under the increased load and preserving the period of the generated current and at the same time increasing the output of the generator.

My invention therefore comprises apparatus for maintaining a uniform period of an induction-generator under change of load by varying the speed of the prime mover proportionally to the variation of slip required by such change of load. More specific features of novelty will be more particularly hereinafter pointed out and will be definitely indicated in the claims.

In the accompanying drawings, which illustrate my invention, Figure 1 shows diagrammatically a system embodying my improvements. Fig. 2 shows a sectional view of the driven member of a generator and the dynamometer connection. Fig. 3 is an end view of the latter. Figs. 4 and 5 are detail views, and Fig. 6 is a diagram of the torque curve of an induction-machine when acting as a generator and motor.

Referring to Fig. 1, the several induction-machines 1 2 3 are shown discharging in parallel into a common supply-circuit A B C and may be driven by the same or by independent prime movers.

As shown in the diagram, Fig. 1, each generator is operated by an independent prime mover, (indicated diagrammatically by the belts 5, 6, and 7.) Between each generator and its prime mover is a dynamometer-governor, such as is indicated in Fig. 2, for automatically increasing the power of the engine as the load of the generator is increased to meet the requirements of service. In operating induction-generators a rotary field is set up in one member and a coöperating member, inductively magnetized by "slip currents," is driven above synchronism, thereby causing the secondary poles developed by the slip currents to cut the poles of the rotary field and generate in the winding of said field the currents which supply the consumption devices. In such machines the period of the generated current depends upon the frequency of alternation furnished by the exciting source, and in the case of a dynamo-electric exciter this speed is not necessarily constant, for the reason that if the generator does not increase in speed with the load the exciter will absorb part of the load and will thereby be slowed down, thus altering its rate. The several generators 1 2 3 are shown in detached view, Fig. 1, as provided with a rotary field-winding on the outside or stationary member, and the inside or driven member is a simple laminated structure of iron provided with a "squirrel-cage" winding consisting of copper rods extending through the core parallel to the axis and spaced symmetrically in a circumferential direction, the ends of said rods connecting with conductive face-plates on the outer sides of the armature-core. Of course either the driven or stationary element might be the outside element, as is well understood by those familar with induction-motors. The magnetizing-currents to develop the rotary fields may be furnished by an auxiliary generator or exciter 4, connected with the mains. As this generator has for its sole function to furnish magnetizing-current and set the period for the system, it may be a simple polyphase machine with a direct-current-charged field-magnet, as indicated in the drawings. The drawings indicate a triphase system. It will of course be understood that a polyphase system of any order may be employed. From what has just been stated it will be understood that a rotary field is established in the primary member of the generators 1 2 3 by the triphase currents furnished by the exciter 4, and when the secondary members are driven at a speed above synchronism in said rotary fields the reaction of the secondary members develops in the rotary field-windings currents which are of the same period as the period of the magnetizing-current, but the volume of which depends upon the slip—that is to say, the excess in speed of the driven member above synchronism with the rotary field. If the driven member falls below synchronism, the machine no longer acts as a generator, but becomes a motor and absorbs energy from the distribution-mains with which it is connected. This relation of generator and motor is clearly indicated by the double torque curve shown in Fig. 6, where the part above the horizontal line indicates the torque curve of an induction-machine when acting as a generator, and the part below said line indicates the same curve of a motor, the stage of synchronism being the point of intersection O of the torque curve with the horizontal line.

In induction-generators it is desirable to maintain the speed above synchronism between this point of intersection and a certain critical speed or excess, depending upon the character of the generator-windings, the critical speed being reached at the knee of the torque curve at $a$. At any speed higher than this, as will be seen in the diagram, the torque falls off, and consequently the output of the generator falls off. I therefore design the dynamometer-governor so that its range of operation lies between the speed of synchronism and the speed corresponding to the crest of the torque curve, and since the slope of the curve depends upon the resistance of the squirrel-cage winding the problem is one of the adjustment of the tension of the dynamometer-governor springs and the characteristic torque curve of the machine. The particular type of dynamometer-governor is not material to my invention. I have shown in Figs. 2, 3, 4, 5 one form which may be employed.

Looking first at Fig. 2, 8 represents the driven member of a generator, being a pile of laminæ of iron provided with copper rods 9, peripherally arranged and in good contact with conductive heads on the ends of the pile. This member is mounted upon a sleeve 10, loose upon the shaft 11, which may be directly connected to a prime mover by a crank or other suitable device. The sleeve 10 is provided with a slot 12, Fig. 5, through which projects a pin 13 set into the shaft. The slot and pin permit a limited motion of the sleeve with relation to the shaft. The shaft 10 is provided with a head or disk 14, connected by springs 15 $15^a$ and dash-pots 16 $16^a$ with a yoke $14^a$, keyed to the shaft 11. Thus it will seen that the armature or driven member 8 may yield elastically with relation to the prime mover, and when the torque increases by increases of load of the generator the springs 15 $15^a$ of the dynamometer-governor will be distended and the sleeve 10 will shift circumferentially with relation to the driving-shaft. By means of these circumferential movements motion is given to a lever 17, which controls the throttle-valve of the engine, or if the prime mover be of a different type its power may be suitably controlled in a way which will be easily evident to engineers.

Figs. 4 and 5 show a device for accomplishing a movement of the rod 17. A ring 18 is fastened to the sleeve 10 and is provided with a beveled edge coöperating with another ring, 19, capable of moving horizontally on the sleeve 10 against the tension of a spring 20. The pin 13, which projects through the slot in the sleeve 10, enters a longitudinal groove in the ring 19, thus preventing it from turning relatively to the shaft. The ring 19 contains a groove on its outside which engages a pin set in the end of the lever 17. When the springs of the dynamometer-governor yield, the relative motion of the rings 18 19 causes an axial movement of the latter against the spring 20 and opens the throttle-valve of the engine.

Having thus described my invention, what I claim as new, and desire to secure by Letters Patent, is—

1. A system of electrical generation comprising a prime mover, an alternating-current induction-generator driven thereby, a speed-varying device for the latter, and control devices for increasing the speed of the generator above synchronism by an amount corresponding to the ordinate of the torque curve of the generator at any particular load.

2. An induction-generator of alternating currents having its driven member connected to the prime mover through a dynamometer-governor, the tension gradient of which is proportioned according to the electric resistance of the secondary member of the generator, whereby its movements are in accordance with the torque curve of the generator.

3. The combination of an induction-generator, a prime mover for driving the generator, an elastic connection between the prime mover and generator, and means operated thereby for increasing the speed of the generator above synchronism by an amount corresponding to the ordinate of the torque curve of the generator at any particular load.

4. The combination of an alternating-current induction-generator, a prime mover for driving the generator, and a dynamometer-governor included in the connection between the prime mover and the generator, having its parts so proportioned with reference to the characteristics of the generator that it will vary the power supplied by the prime mover in accordance with the torque curve of the generator at speeds above synchronism.

5. The combination of an alternating-current induction-generator, a prime mover for driving the generator, and governing means included in the connection between the prime mover and generator for varying the power supplied by the prime mover in accordance with the torque curve between the limits of synchronism and a speed corresponding to maximum torque.

In testimony whereof I have hereunto subscribed my name, this 27th day of August, A. D. 1897.

CHARLES S. BRADLEY.

Witnesses:
 ROBT. H. READ,
 ALICK G. MACANDREW.